(12) United States Patent
Qian et al.

(10) Patent No.: US 11,407,232 B2
(45) Date of Patent: Aug. 9, 2022

(54) METHOD OF PRINTING AND PRINTING APPARATUS

(71) Applicant: Hewlett-Packard Development Company, L.P., Spring, TX (US)

(72) Inventors: Li Qian, Sant Cugat del Valles (ES); Javier Castro Soriano, Sant Cugat del Valles (ES); Ruben Recasens Oros, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/977,756

(22) PCT Filed: Apr. 23, 2018

(86) PCT No.: PCT/US2018/028847
§ 371 (c)(1),
(2) Date: Sep. 2, 2020

(87) PCT Pub. No.: WO2019/209247
PCT Pub. Date: Oct. 31, 2019

(65) Prior Publication Data
US 2021/0086522 A1     Mar. 25, 2021

(51) Int. Cl.
*B41J 29/393*  (2006.01)
*B41J 2/21*  (2006.01)
*G06K 15/10*  (2006.01)

(52) U.S. Cl.
CPC ......... *B41J 2/2132* (2013.01); *B41J 2/2139* (2013.01); *B41J 29/393* (2013.01); *G06K 15/107* (2013.01)

(58) Field of Classification Search
CPC .................................................. B41J 2/2142
See application file for complete search history.

(56) References Cited

U.S. PATENT DOCUMENTS 6,080,959 A     6/2000  Komplin
6,278,469 B1    8/2001  Biand
(Continued)

FOREIGN PATENT DOCUMENTS

EP     1281532     2/2003
EP     2103439     9/2009

OTHER PUBLICATIONS

International Search Report and Written Opinion dated Dec. 13, 2018, PCT Patent Application No. PCT/US2018/028847, filed Apr. 23, 2018, Federal Institute of Industrial Property, Moscow, Russia, 7 pages.

*Primary Examiner* — Julian D Huffman
(74) *Attorney, Agent, or Firm* — HP Inc. Patent Department (57) ABSTRACT

A method comprises printing an image using a printhead cartridge including a number of dies, each die comprising a nozzle array, the printing comprising: determining a drop parameter of fluid drops ejected from nozzles of the nozzle array of at least one die; comparing the drop parameter to a threshold value; and determining an image characteristic of an image to be printed; and if the image characteristic meets a defined criterion and if the drop parameter exceeds the threshold value, applying a second print mask for printing the image; and if the image characteristic does not meet the defined criterion or if the drop parameter does not exceed the threshold value, applying a first print mask for printing the image, wherein the second print mask uses less nozzles of the nozzle arrays than the first print mask.

15 Claims, 6 Drawing Sheets

(56) References Cited

U.S. PATENT DOCUMENTS

| | | | |
|---|---|---|---|
| 6,550,997 B1 | 4/2003 | King | |
| 6,938,994 B2 | 9/2005 | Silverbrook | |
| 8,864,266 B2 | 10/2014 | Suzuki | |
| 9,537,119 B2 | 1/2017 | Harjee | |
| 2005/0134922 A1* | 6/2005 | Walmsley | B41J 2/04505 |
| | | | 358/3.13 |
| 2011/0157279 A1 | 6/2011 | Nielsen et al. | |
| 2012/0075370 A1* | 3/2012 | Ramakrishnan | B41J 2/04508 |
| | | | 347/10 |
| 2019/0001666 A1* | 1/2019 | Xue | B41J 11/0015 |

* cited by examiner

METHOD OF PRINTING AND PRINTING APPARATUS

CLAIM FOR PRIORITY

The present application is a national stage filing under 35 U.S.C 371 of PCT application number PCT/US2018/028847, having an international filing date of Apr. 23, 2018, the disclosure of which is hereby incorporated by reference in its entirety.

BACKGROUND

A color printer may include a number of printhead cartridges. A printhead cartridge may contain one or several printing fluids, wherein some of the printing fluids may be non-marking printing fluids, e.g., overcoats and the like and some printing fluids may be dies associated with a same color or with different colors. A die may provide a line or row of nozzles, also referred to as nozzle array or nozzle trench. When printing with a number of printhead cartridges, using a multiple-pass printing mode, masks may be applied to the nozzles to selectively deposit droplets of printing fluid on a print medium, pass by pass, to control the printing process. Print masks may help to prevent or reduce visible artifacts, such as image banding.

SHORT DESCRIPTION OF DRAWINGS

Examples are described with reference to the drawings.

DESCRIPTION OF EXAMPLES

Whereas, in the present application, a number of examples are described for illustration, this disclosure is not limited to these specific examples described and can be applied to similar devices, systems, methods and processes. The examples provided herein may be implemented in a large format printer, a desktop printer or another printing apparatus for dispensing printing fluid, such as ink. In one example the printing apparatus is an inkjet printer. Printhead cartridges may be provided on a carriage for scanning over a print medium in a print zone or printheads may be provided in form of a page-wide printing array. In some examples, a printhead cartridge contains one or several dies wherein each die is provided for a same color or for different colors. For example, one printhead may comprise between one and ten dies, each die having a nozzle array providing one or two or more rows of inkjet nozzles.

Figure 1:
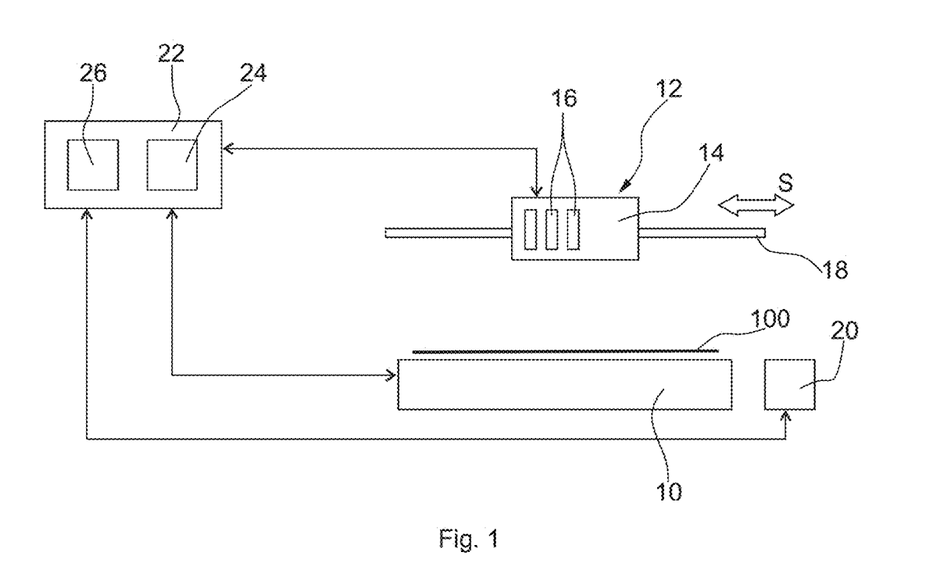
FIG. 1 shows a schematic drawing of a printer according to an example, in a side view.
Figure 2:
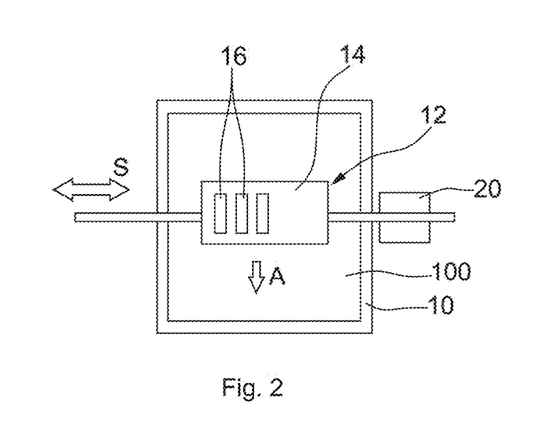
FIG. 2 shows a schematic drawing of the printer of FIG. 1, in a top view.

FIGS. 1 and 2 show schematic overviews of certain features of a printing apparatus, in the following referred to as printer. The printer may be a large format printer or desktop printer, for example. The printer comprises a print support 10 arranged to carry a print medium 100 through a print zone. A transport mechanism (not shown), in use, may transport the print medium 100 to be printed upon in a media advance direction A, through the print zone below a printhead assembly 12. In the present example, the printhead assembly 12 comprises a print carriage 14, carrying a number of printhead cartridges 16, such as one, three, five, eight or more printhead cartridges 16. The print carriage 14 bidirectionally slides along a slide bar 18 across the print zone, in a scanning direction S, perpendicular to the media advance direction A. The printer further comprises a drop detector 20, for example, at the side of the print zone. Also, the drop detector may be located, e.g., in an area associated to a servicing station (not shown).

The printer further comprises a controller 22 (not shown in FIG. 2) which is to control the printhead assembly 12 to fire a fluid from nozzles of the printhead cartridges 16, being the controller 22 to control a scanning movement of the print carriage 14 to control a movement of the print medium 100 through the print zone, and to control the drop detector 24 for detecting at least one of drop weight and drop velocity of fluid drops ejected from the printhead cartridges 16. Instead of one controller 22, several controllers could be provided for the print medium transport control, print carriage control, printhead cartridge control and drop detector control. The controller 22 may include a processor 24 and memory 26. The processor 24 may have access to the memory 22. The controller 22 may store program modules for implementing a process according to examples as described herein.

Whereas this is not illustrated in detail, the printhead cartridges 16 may be replaceable and/or refillable cartridges. Additional ink supply cartridges may be provided within or externally to the printing apparatus and may be connected to the printhead cartridges via an ink tube assembly. The printer may comprise further components, such as a frame and supporting structure, a print medium feed system, motors, etc., which are not shown or described in detail.

Figure 3:
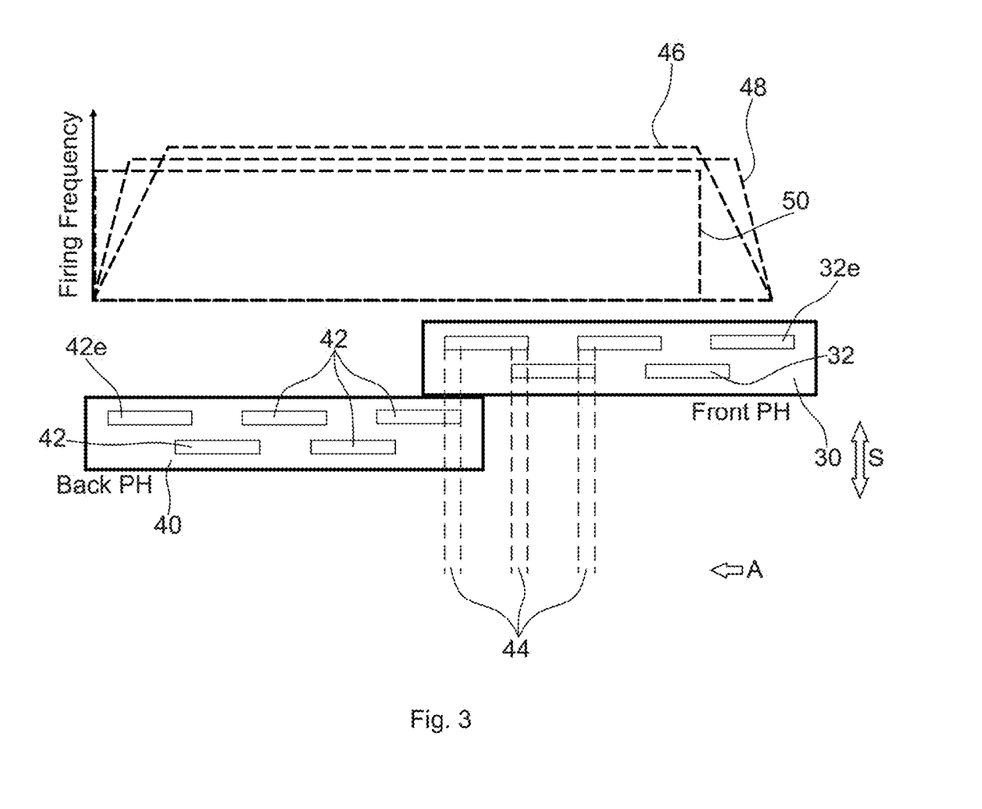
FIG. 3 shows a schematic representation of a printhead assembly in a printer relative to a mask, according to an example.

FIG. 3 shows an example of an arrangement of a number of printhead cartridges which are used for illustrating examples of this disclosure. In the example of FIG. 3, two printhead cartridges 30, 40 are illustrated, each printhead cartridge including five dies 32, 42 wherein the printhead cartridges 30, 40 and the dies 32, 42 within each printhead cartridge are staggered to provide overlap zones in the carriage scanning direction S. Some of the overlap zones 44 are schematically illustrated as stripes with additional overlap zones being present also between the other dies. Each die 32, 42 may include one or two parallel nozzle trenches, for example. In the example of FIG. 3, both printhead cartridges 30, 40 may dispense the same type of ink having a same color from both of the dies 32, 42. FIG. 3 also illustrates the media advance direction A wherein printhead cartridge 30 may be considered to be a back printhead (Back PH) cartridge and printhead cartridge 40 may be considered to be a front printhead (Front PH) cartridge in the media advance direction A.

Printhead assemblies can be different from the one shown in FIG. 3. For example, in another printhead cartridge configuration, more or less printhead cartridges carried by a print carriage may be provided, or the printing apparatus may comprise a print bar extending across the print zone. In different examples, a printhead assembly may comprise a print carriage providing one, three, five or eight cartridge slots, for example. In one example, three, four or five cartridge slots may be fitted with color ink cartridges, one or two slots may be provided with dummy cartridges or be left empty, and one slot may be provided with an optimizer fluid cartridge. Each cartridge may exhibits one, two or more rows of nozzle trenches, with each of the nozzle trenches of a die ejecting the same type and color of fluid, or different types of fluids, or different colors of the same type of fluid. For example, a cartridge for an optimizer fluid may include two trenches for ejecting optimizer fluid. Other printhead cartridges may each provide two different color inks from respective two trenches of nozzles. For example, colors CMYK (cyan, magenta, yellow, black) may be dispensed from two staggered nozzle trenches each, and an additional cartridge may be provided for dispensing lighter colors. An optimizer fluid may be a fixer fluid or a binding fluid, for example, which is used in combination with certain inks, such as latex ink, to improve adherence of the ink to a print medium and avoid coalescence. There is no limitation to any particular printhead assembly. Printheads which are arranged in one or several printhead cartridges and to which a mask is applied for printing, can be considered to form a printhead array.

There are different approaches for dealing with banding effects, such as applying masks to the nozzle trenches, the mask applying different ink usage per nozzle in an interleaving, weaving, pass programming selection, or other manner. In a multi-pass print mode, a mask is applied to the printhead cartridges during each pass so that a section or band of an image is composed by a number of pixels printed during the number of passes. In a three-pass print mode, for example, the print medium is advanced by one third of a swath height after each pass and the printhead cartridges are masked to print part of the image during each pass.

Ramped masks can be used, including an up-ramp, a flat middle part and a down-ramp, as illustrated in FIG. 3 which shows two different types of ramped masks 46 and 48. 46 is a so-called "large mask" which is a special mask in which the ramp size may coincide with the media advance. 48 is a so-called "interleaved mask" which does not follow this rule but uses nozzles of the outer edge dies 32e, 42e, in an interleaving manner. The ramp areas and flat areas of a ramped mask are areas that apply different ink usage per nozzle. The ramp size can be a variant. The nozzles close to the end of a printhead have less probability in firing. FIG. 3 also illustrates a square mask 50 which, in a respective pass, may disable all of the nozzles of one of the outer edge dies 32e or 42e, such as die 32e in the example of FIG. 3. A separate mask can be applied to each printhead array associated with a respective different color and/or type of ink.

Whereas the present disclosure is explained with reference to a mask applied to one printhead array comprised of two printhead cartridges dispensing a single color ink, the process as described herein can be adapted to masking printhead arrays of all colors and ink types, such as printhead arrays of C, M, Y, and K inks. The masking process can be applied irrespective of whether a printhead array is concentrated in one or a plurality of printhead cartridges dispensing a single color ink, as in the example of FIG. 3 or whether the printhead array is distributed over a plurality of printhead cartridges dispensing multiple color inks.

In each of these masking schemes addressed above, more ink will be deposited by the middle section of the printhead array than by the edge sections, wherein the edge sections may comprise the entire outer edge dies or a part of the nozzles of the outer edge dies so that there is uneven usage of the printhead dies over the lifetime of a printhead cartridge.

Accordingly, due to the size and shape of print masks, e.g. having ramps in areas of overlap, nozzle in overlap and edge areas may be used less frequently than nozzle in center areas so that nozzle degradation is non-uniform. More frequently used nozzles may generate fluid drops of reduced drop velocity (DV) and/or reduced drop weight (DW). Uneven DV and DW may create image quality (IQ) defects wherein defects due to DW variation may be more visible in images with large areas of solid colors and defects due to DV variation may be more visible in images with vertical lines.

One way to address this phenomenon may be to determine a drop parameter of fluid drops ejected from the nozzles of the nozzle array of at least one die, comparing the drop parameter to a threshold value, and determining an image characteristic of an image to be printed. If the image characteristic meets a defined criterion and if the drop parameter exceeds the threshold value, a second print mask may be used for printing the image; and if the image characteristic does not meet the defined criterion or if the drop parameter does not exceed the threshold value, a first print mask may be used for printing the image. In other words, the second print mask is used when both conditions are met, the first print mask is used when one or none of the conditions is met. The second print mask may use less nozzles of the nozzle arrays than the first print mask.

This allows adjusting or selecting a print mask which disables non-uniformly operating nozzles, as a function of the image composition. In one example, nozzles may be disabled which generate a DW or DV which differs from an average DW or average DV by more than a threshold value. These nozzles may be disabled for images having a defined image composition, such as a large area of solid color or vertical lines, and may be enabled for other types of image compositions. Accordingly, the masking scheme may depend on both the state of the nozzles and the type of image to be printed. This reduces IQ defects and maintains throughput because print masks disabling some of the nozzles are used if useful for a particular image composition and are not used in other cases.

Figure 4:
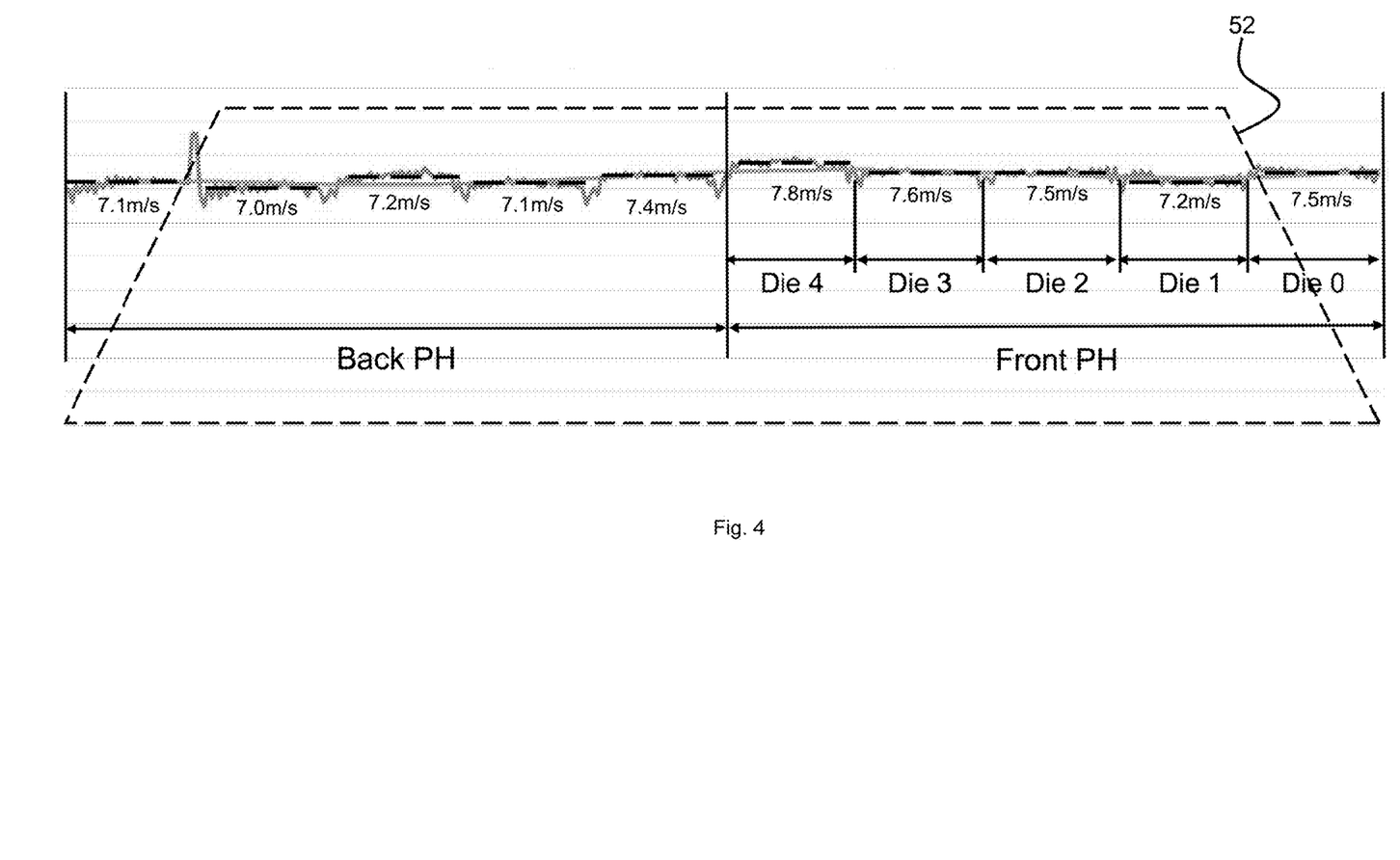
FIG. 4 shows a curve of a drop parameter of printhead dies relative to a mask, according to an example.

FIG. 4 illustrates a curve of a drop parameter of printhead dies relative to a mask, as determined by a drop detector, according to an example. More specifically in the example of FIG. 4, the curve illustrates a drop velocity of a full swath printed by all of the dies 32, 42 of the two printhead cartridges 30, 40 of the example of FIG. 3, under the assumption that printhead cartridges 30, 40 are at the beginning of their useful life time, having a past ink consumption of 0 liters (L) or close to 0 L. In the diagram of FIG. 4, printhead cartridges 30, 40 are designated as Back PH and Front PH, in line with the diagram of FIG. 3, and the dies of Front PH are designated as Die0 to Die4, with corresponding dies being present in the Back PH. In this case, the curve of the drop parameter, here: DV, is relatively flat exhibiting an average drop velocity in the range of 7.1 m/s to 7.8 m/s across the individual dies, i.e. Die0 to Die4 of Front PH and corresponding dies of Back PH. There is not more than a variation of the average drop velocity of about 10% between the dies which is considered to be within manufacturing tolerances and would have no or no noticeable effect on the image quality.

FIG. 4 also illustrates an example of a mask 52 which may be applied to the printhead cartridges 30, 40 in a multi-pass print mode, as explained above. Using this mask 52, the nozzles of the dies located at the outer edges of the printhead cartridges, such as Die0 of Front PH and Die4 of Back PH, would be used less frequently than the remaining dies. Die0 of Front PH corresponds to die 42e in FIG. 3, and Die4 of Back PH corresponds to die 32e in FIG. 3. The masking scheme may result in less degradation of some or all of the nozzles of outer edge dies than of the nozzles of the other dies or, more generally speaking, to an uneven degradation across dies and nozzles.

Figure 5:
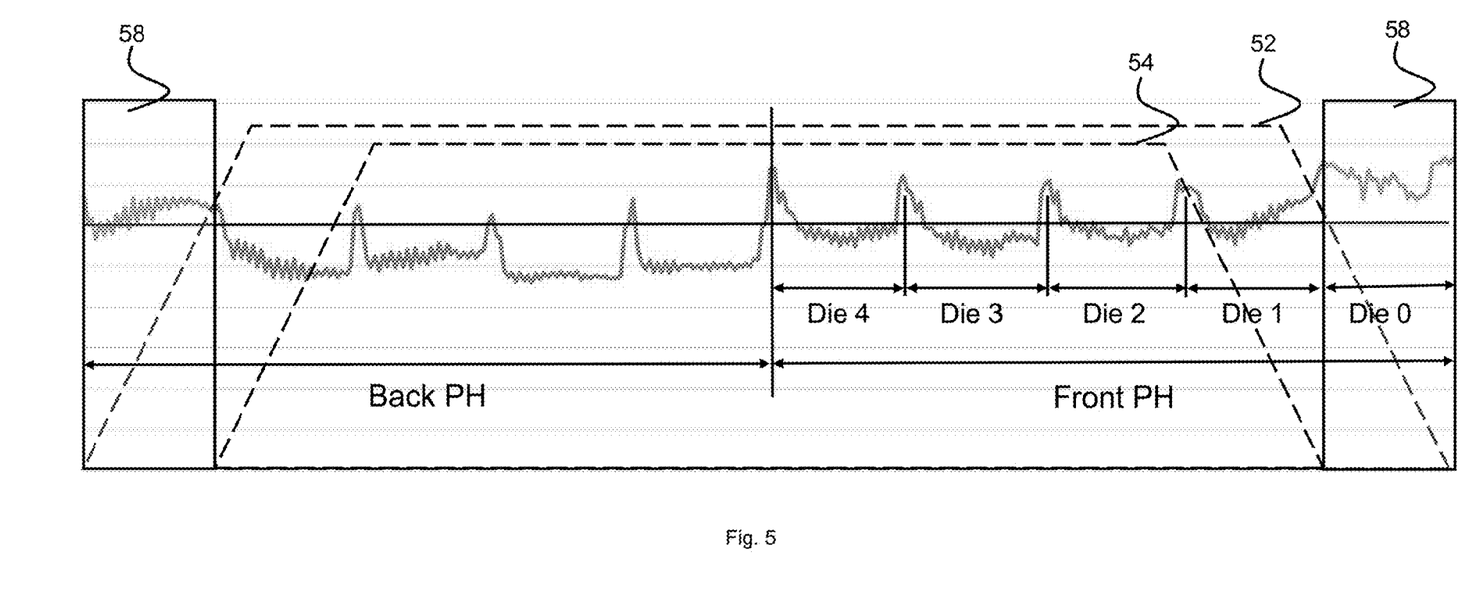
FIG. 5 shows a curve of a drop parameter of printhead dies relative to a mask, according to another example.

FIG. 5 illustrates a curve of a drop parameter of printhead dies relative to the mask 52 of FIG. 4 and relative to a modified mask 54, according to an example. More specifically in the example of FIG. 5, the curve illustrates a drop velocity of a full swath printed by all of the dies 32, 42 of the two printhead cartridges 30, 40 of the example of FIG. 3, under the assumption that the printhead cartridges 30, 40 are more advanced in their useful life time, having a past ink consumption of about 16 liters (L), just as an example. In the diagram of FIG. 5, printhead cartridges 30, 40 are designated as Back PH and Front PH, and the dies of Front PH are designated as Die0 to Die4, with corresponding dies being present in the Back PH. In this case, the curve of the drop parameter, here: DV, is less flat than in the example of FIG. 4, exhibiting an average drop velocity in the range of 5.7 m/s to 6.2 m/s for Die1 to Die4 of the Front PH, of 7.1 m/s for Die0 of the Front PH, of 4.8 m/s to 5.3 m/s for Die0 to Die3 of the Back PH, and of 6.4 m/s for Die4 of the Back PH. These values are just examples and are not separately indicated in the drawings. Accordingly, the drop velocity of the respective outer edge dies, Die0 of the Front PH and Die4 of the Back PH, varies by about 1 m/s from the average drop velocity of the remaining dies of the same printhead or by about 20% which is considered to be outside of manufacturing tolerances and which may have a noticeable effect on the image quality, depending on the type of image to be printed.

Similar curves could be established based on drop weight, for example. Drop velocity and drop weight may be detected by drop detector 20 and evaluated by controller 22.

Accordingly, if a variation of the drop parameter, such as drop velocity or drop weight, is detected which is above (or below) a certain threshold, such as above (or below) an absolute or relative value, the controller 22 may make a decision to modify or select a print mask 54 which disables some or all of the nozzles or dies which exhibit the variation, depending on the characteristics of the image to be printed. The threshold may be a relative parameter value calculated based on a defined percentage of an average value or of an initial value or of a nominal value of the drop parameter. Depending on how the threshold is defined, a threshold may be considered to be exceeded if the drop parameter is above or below the threshold. In the present examples described, the threshold is exceeded if the drop weight or drop velocity is above a respective drop weight threshold or drop velocity threshold.

In the example of FIG. 5, a modified print mask 54 is used, which disables nozzles or entire printhead dies in outer edge regions 58 of both printhead cartridges, Front PH and Back PH, 30, 40. In this specific example, the entire Die0 of the Front PH and the entire Die 4 of the Back PH is disabled. In other examples, selected ones of the nozzles of one or several dies could be disabled by a modified mask. For example, outer edge nozzles of outer edge dies or nozzles of some or all dies within overlap regions, such as illustrated at 44 in FIG. 3, could be disabled by a modified mask.

A modified mask will be applied if the drop parameter exceeds the threshold value and if the image characteristic meets a defined criterion, i.e. if both conditions are met. The image characteristic may be the presence of a continuous area of an image which is to be covered by a solid color, wherein the continuous area is at least 2%, at least 5% or at least 10% of the entire image area, for example. The image characteristic also may be a continuous area of the image which is to be covered by a solid color, wherein the continuous area is at least 1 $cm^2$ or at least 4 $cm^2$, for example. If the image characteristic is a continuous area of the image to be covered by a solid color, whether or not the image characteristic meets the defined criterion also may depend on the total size of the image. The solid color may be a single color or may include colors having a maximum color difference from a single color, the color difference being smaller than a given tolerance threshold. For example, the color difference may be determined according to a perceptually uniform color measure, such as a Euclidean distance in the CIELAB color space.

The above process of analyzing a drop parameter and determining an image characteristic and of adapting or selecting a mask as a function of drop parameter and image characteristic, can be performed separately for each printhead array associated with a respective different color, such as Cyan, Magenta, Yellow, and Black printhead arrays. A printhead array of a respective color may be formed from one or several printhead cartridges including single-color and multi-color cartridges and respective printhead dies.

The image characteristic additionally or alternatively may be the presence of vertical lines in an image, i.e. lines extending in the media advance direction. The image characteristic also could take into account a particular image pattern, such as a checkerboard pattern or another repetitive pattern, for example.

Figure 6:
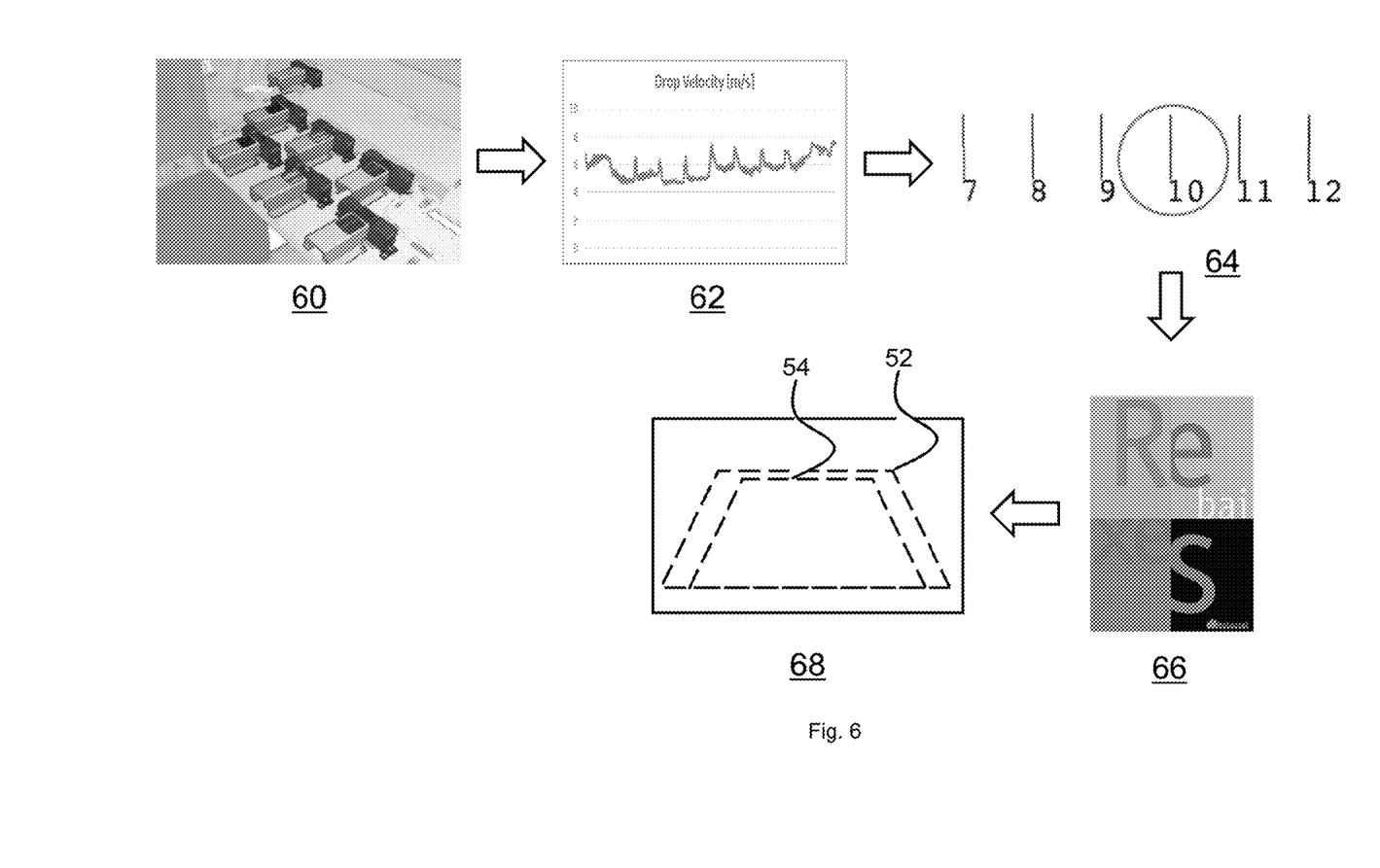
FIG. 6 schematically illustrates a process according to an example.

FIG. 6 schematically illustrates a process according to an example. The process starts at 60 with obtaining information from a drop detector, such as drop detector 20 in FIGS. 1 and 2. The information relates to a drop parameter of fluid drops ejected from the printhead cartridges, such as drop weight and drop velocity. The information may be obtained from all nozzles of all dies of all printhead cartridges or from a portion thereof. Drop detectors may be provided at the side of the print zone, in the print carriage scanning direction, such as in the area of a servicing station. Drop detection may be performed when a printer is turned on, before starting a print job, or during a servicing operation, for example.

At 62, the information obtained from the drop detector is analyzed to calculate a drop parameter, such as drop weight and/or drop velocity. The drop parameter, such as drop weight and/or drop velocity, may be obtained for all nozzles of all dies of all printhead cartridges or for a portion thereof. The drop parameter may be visualized as a curve, as illustrated in FIGS. 4 and 5, for example.

At 64, the calculated drop parameter is analyzed further, such as compared to a threshold, to determine whether the drop parameter of some or all of the nozzles of some of the dies exceed a threshold. The threshold may be a relative value, calculated based on an average value or median of the drop parameter, for example. A variation of the drop parameter of some of the nozzles or some of the dies above or below the threshold may indicate that there is uneven nozzle degradation which may result in noticeable image quality defects. If the drop parameter for some or all of the nozzles of some of the dies, e.g. for all or some nozzles of an edge die, exceeds the threshold, a process is triggered to determine whether an adaptive mask should be used. Additionally, if the drop parameter is the drop velocity and if it is determined that the drop velocity of some or all of the nozzles of some of the dies, e.g. of some or all nozzles of an edge die, exceeds the threshold, an alignment process may be triggered to compensate for the DV variation.

At 66, before printing, an image content of an image to be printed is analyzed to determine whether the image includes an image characteristic which meets a defined criterion, such as a minimum area of solid color. The image characteristic is one which may result in a noticeable image quality defect, such as banding, if the image was printed using the entire array of nozzles and dies exhibiting an uneven nozzle degradation. As explained above, after an extended lifetime, the nozzles located in the middle of a printhead array of one or several printhead cartridges may have been used more frequently than nozzle at the edges of the printhead array so that the nozzles at the edges of the printhead array may show less degradation than the majority of the nozzles in the middle. Accordingly, the nozzles at the edges of the printhead array will be able to eject fluid drops having a higher drop weight and/or higher drop velocity. To avoid noticeable image quality defects, the image content is analyzed to determine whether the image is such that the uneven nozzle degradation will be noticeable in the printed image. If this is not the case, a default mask, such as mask 52, may be used for printing.

At 66, an image having extended areas of solid colors is illustrated wherein this type of image may trigger adapting a mask or selecting a second mask 54 which disables some of the nozzles or dies determined to have a variation of the drop parameter above the threshold. The nozzles or dies determined to have a variation of the drop parameter above the threshold may be located at the outer edges of the printhead array. Accordingly, at 68, and adapted mask or second mask 54 can be selected for printing the image shown at 66, disabling the nozzles or dies at the outer edges of the printhead array.

Figure 7:
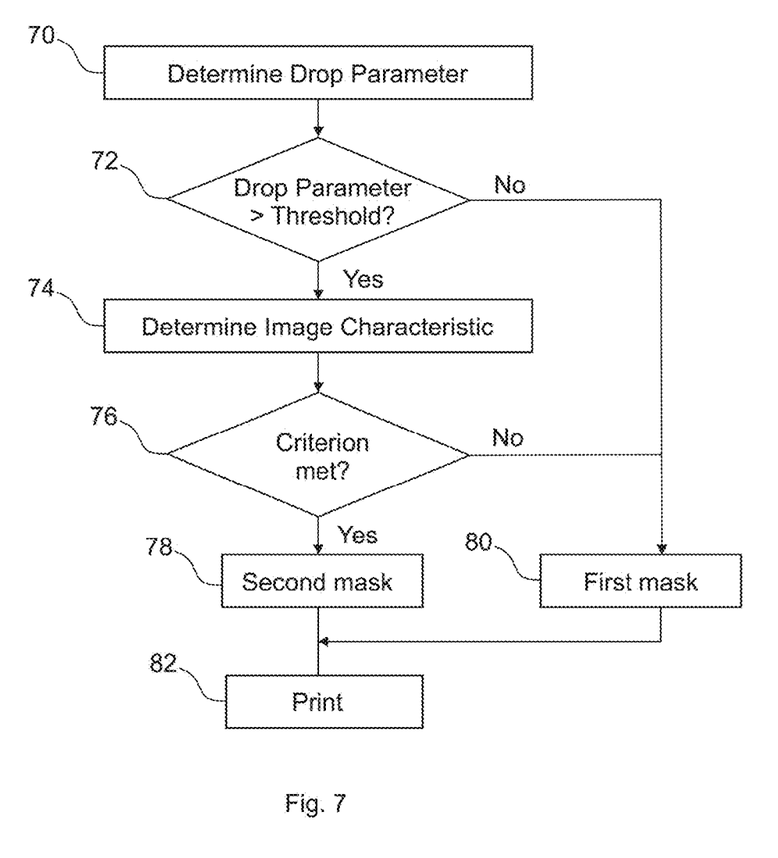
FIG. 7 shows a flow diagram of a method according to an example.

FIG. 7 shows a flow diagram of an example of a method of good image quality printing at high throughput. At 70, the method determines a drop parameter of fluid drops ejected from nozzles of the nozzle array of at least one die, such as drop weight or drop velocity. The drop parameter may be determined for all or some of the nozzles of all or some of the dies of a printhead array. The drop parameter further may be determined separately for the nozzles and dies of separate colors.

At 72, it is determined whether the drop parameter exceeds a threshold, indicating that the associated nozzle exhibits a firing characteristic different from other nozzles, such as higher drop weight or higher drop velocity, as explained above. If yes, an image characteristic is determined at 74 wherein the image characteristic may relate to an area of solid color, for example. At 76, it is determined whether the image characteristic meets a defined criterion, such as an area of solid color greater than a defined size. If this criterion is met, the method proceeds with selecting a second mask, at 78. A second mask may be one which disables those nozzles which exhibit the firing characteristic different from other nozzles.

The sequence may be different from the one shown in FIG. 7. For example, the method may start with determining the image characteristic before determining the drop parameter, or it may first determine both the drop parameter and the image characteristic, in any order or simultaneously, before doing any comparison.

If, at 72, it is determined that the drop parameter does not exceed the threshold and/or if, at 76, it is determined that the image characteristic does not meet the criterion, the method proceeds to selecting a first or default mask, at 80. The first mask or default mask may be one which enables all nozzles, irrespective of whether they exhibit firing characteristic different from other nozzles At 82, the selected first mask or second mask is used for printing.

What is claimed is:

1. A method for printing an image using a printhead including a number of dies, each die comprising nozzles to eject fluid drops onto a print medium, the method comprising:
   determining a drop parameter, including a drop velocity, of the fluid drops ejected from the dies;
   comparing the drop velocity of the fluid drops to a threshold value;
   determining whether an image characteristic of the image to be printed meets a predefined criterion;
   in response to a determination that the image characteristic of the image does not meet the predefined criterion or the drop velocity of the fluid drops does not exceed the threshold value, applying a first print mask for printing the image, wherein the first print mask uses all of the dies of the printhead to print the image; and
   in response to a determination that both the image characteristic of the image meets the predefined criterion and the drop velocity of the fluid drops exceeds the threshold value, applying a second print mask for printing the image, wherein the second print mask disables at least one die of the printhead from being used to print the image.

2. The method of claim 1, wherein determining the drop parameter of the fluid drops further includes determining a drop weight of the fluid drops ejected from the dies.

3. The method of claim 1, wherein determining whether the image characteristic of the image to be printed meets the predefined criterion includes determining whether a continuous area of the image which is to be covered by a solid color is at least 5% of an entire image area.

4. The method of claim 1, wherein determining whether the image characteristic of the image to be printed meets the predefined criterion includes determining whether a continuous area of the image which is to be covered by a solid color is at least 1 cm$^2$ or at least 4 cm$^2$.

5. The method of claim 1, wherein the threshold value is calculated based on a defined percentage of an average value of the drop velocity of the fluid drops ejected from the dies of the printhead.

6. The method of claim 1, wherein the first print mask and the second print mask are ramped print masks.

7. The method of claim 6, wherein the second print mask is smaller than the first print mask.

8. The method of claim 6, wherein the second print mask disables a die located in an outer edge region of the printhead and enables the remaining dies to eject the fluid drops.

9. A printing apparatus including:
   a printhead cartridge having a number of dies, each die including nozzles to eject fluid drops to print an image on a print medium;
   a drop detector to determine a drop parameter including a drop velocity of the fluid drops ejected from the nozzles of the dies; and
   a controller to:
      control firing of the nozzles of the dies to eject the fluid drops,
      compare the drop velocity of the fluid drops to a threshold value,
      determine whether an image characteristic of the image to be printed meets a predefined criterion,
      in response to a determination that the image characteristic of the image does not meet the predefined criterion or the drop velocity of the fluid drops does not exceed the threshold value, apply a first print mask for printing the image, wherein the first print mask uses all of the dies of the printhead cartridge to print the image, and in response to a determination that both the image characteristic of the image meets the predefined criterion and the drop velocity of the fluid drops exceeds the threshold value, apply a second print mask for printing the image, wherein the second print mask disables at least one die of the printhead cartridge from being used to print the image.

10. The printing apparatus of claim 9, wherein, to determine whether the image characteristic of the image meets the predefined criterion, the controller is to determine whether a continuous area of the image which is to be covered by a solid color is at least 5% of an entire image area.

11. The printing apparatus of claim 9, wherein, to apply the second print mask for printing the image, the controller is to disable a die located in an outer edge region of the printhead cartridge and enable the remaining dies to eject the fluid drops.

12. The printing apparatus of claim 9, wherein the first and second print masks are ramped print masks.

13. A non-transitory computer-readable storage medium storing instructions that, when executed by a processor, cause the processor to:
control a printing apparatus to print an image by controlling a number of dies in a printhead cartridge of the printing apparatus to eject fluid drops onto a print medium;
determine a drop velocity of the fluid drops ejected from the dies;
compare the drop velocity of the fluid drops to a threshold value;
determine whether an image characteristic of the image to be printed meets a predefined criterion;

in response to a determination that the drop velocity of the fluid drops does not exceed the threshold value or the image characteristic of the image does not meet the predefined criterion, apply a first print mask for printing the image, wherein the first print mask uses all of the dies of the printhead cartridge to print the image; and in response to a determination that both the image characteristic of the image meets the predefined criterion and the drop velocity of the fluid drops exceeds the threshold value, apply a second print mask for printing the image, wherein the second print mask disables at least one die of the printhead cartridge from being used to print the image.

14. The non-transitory computer-readable storage medium of claim 13, wherein the instructions, when executed by the processor, further cause the processor to:
measure a drop weight of the fluid drops ejected from each die;
determine an average drop weight of the measured drop weights;
determine the threshold value as a minimum deviation from the average drop weight; and
apply the second print mask if the drop weight of the fluid drops ejected from a minimum number of nozzles of one die exceeds the threshold value.

15. The non-transitory computer-readable storage medium of claim 13, wherein the instructions, when executed by the processor, further cause the processor to:
analyze, based on print data, the image to be printed to detect a continuous area of the image to be printed by a solid color;
determine whether the continuous area covers a defined minimum area size; and
in response to a determination that the continuous area covers the defined minimum area size, determine that the predefined criterion is met.

* * * * *